United States Patent
Takechi et al.

(10) Patent No.: US 10,667,504 B2
(45) Date of Patent: Jun. 2, 2020

(54) FISHING REEL WATERPROOF STRUCTURE

(71) Applicants: Shimano Inc., Sakai, Osaka (JP); Shimano Components (Malaysia) SDN. BHD., Pontian, Johor (MY)

(72) Inventors: Kunio Takechi, Sakai (JP); Youhei Toake, Sakai (JP); Abu Supian Bin Ahmad, Johor (MY)

(73) Assignees: SHIMANO INC., Sakai, Osaka (JP); SHIMANO COMPONENTS (MALAYSIA) SDN. BHD., Pontian, Johor (MY)

( * ) Notice: Subject to any disclaimer, the term of this patent is extended or adjusted under 35 U.S.C. 154(b) by 125 days.

(21) Appl. No.: 15/687,659

(22) Filed: Aug. 28, 2017

(65) Prior Publication Data
US 2018/0125048 A1 May 10, 2018

(51) Int. Cl.
*A01K 89/01* (2006.01)
*A01K 89/015* (2006.01)

(52) U.S. Cl.
CPC .... *A01K 89/01928* (2015.05); *A01K 89/0193* (2015.05)

(58) Field of Classification Search
CPC . A01K 89/01928; A01K 89/0193; F16J 15/02
See application file for complete search history.

(56) References Cited

U.S. PATENT DOCUMENTS

| 5,308,018 | A | * | 5/1994 | Furomoto | A01K 89/057 242/271 |
|---|---|---|---|---|---|
| 5,415,359 | A | * | 5/1995 | Ikuta | A01K 89/0191 242/271 |
| 5,996,918 | A | * | 12/1999 | Nanbu | A01K 89/046 242/267 |
| 2002/0023980 | A1 | * | 2/2002 | Matsuda | A01K 89/00 242/319 |
| 2003/0111569 | A1 | * | 6/2003 | Hitomi | A01K 89/01122 242/321 |
| 2015/0115088 | A1 | * | 4/2015 | Toma | A01K 89/01928 242/283 |

(Continued)

FOREIGN PATENT DOCUMENTS

JP 11113464 * 4/1999 ............ A01K 89/02
JP 2006254762 A 9/2006

*Primary Examiner* — Emmanuel M Marcelo
(74) *Attorney, Agent, or Firm* — United IP Counselors, LLC (57) ABSTRACT

A fishing reel waterproof structure prevents water intrusion into a bearing member that supports an end of a handle shaft to make the end of the handle shaft rotatable respective to a reel body. The fishing reel waterproof structure includes a flange part, a fixation plate, a seal member and a water stop part. The flange part is on the handle shaft in a vicinity of the end of the handle shaft. The fixation plate restricts axial movement of the bearing member. The fixation plate has an annular shape and is fixed to the reel body. An inner peripheral part of the fixation plate is disposed between the flange part and the bearing member to contact a lateral surface of the bearing member. The seal member seals between the reel body and the fixation plate. The water stop part prevents water intrusion between the flange part and the fixation plate.

12 Claims, 6 Drawing Sheets

(56) References Cited

U.S. PATENT DOCUMENTS

| | | | |
|---|---|---|---|
| 2015/0216155 A1* | 8/2015 | Matsuda | A01K 89/0108 |
| | | | 242/321 |
| 2016/0106083 A1* | 4/2016 | Niitsuma | A01K 89/0192 |
| | | | 242/310 |
| 2017/0181419 A1* | 6/2017 | Ochiai | A01K 89/01122 |
| 2017/0238516 A1* | 8/2017 | Ahmad | A01K 89/01916 |
| 2017/0332614 A1* | 11/2017 | Saito | A01K 89/01902 |
| 2018/0055025 A1* | 3/2018 | da Rosa | A01K 89/01122 |

* cited by examiner

FISHING REEL WATERPROOF STRUCTURE

CROSS-REFERENCE TO RELATED APPLICATIONS

This application claims priority to Japanese Patent Application No. 2016-218113 filed on Nov. 8, 2016, the entirety of which is hereby incorporated by reference in its entirety.

BACKGROUND

Technical Field

The present disclosure relates to a fishing reel waterproof structure.

Background Information

In general, fishing reels include a handle shaft to which rotation of a handle is transmitted. The handle shaft is rotatably supported by a reel body through a bearing member. In a fishing reel described in Japan Laid-open Patent Application Publication No. 2006-254762, a lock member is fixed to a frame so as to prevent the bearing member supporting the handle shaft from being detached from the frame, whereby the handle shaft and the bearing member are prevented from being detached from the frame.

When seawater or so forth intrudes into the bearing member supporting the handle shaft, salt deposits and this results in failure in rotation of the handle shaft, in other words, failure in rotation of the handle.

BRIEF SUMMARY

It is an object of the present disclosure to inhibit intrusion of seawater or so forth into the interior of a bearing member supporting a handle shaft in a fishing reel waterproof structure.

A fishing reel waterproof structure according to the present disclosure is provided for preventing water intrusion into a bearing member that supports an end of a handle shaft so as to make the end of the handle shaft rotatable with respect to a reel body. The fishing reel waterproof structure includes a flange part, a fixation plate having an annular shape, a seal member and a water stop part. The flange part is provided on the handle shaft in a vicinity of the end of the handle shaft. The fixation plate having the annular shape restricts axial movement of the bearing member. The fixation plate is fixed to the reel body and is disposed such that an inner peripheral part of the fixation plate is disposed between the flange part and the bearing member to contact a lateral surface of the bearing member. The seal member seals between the reel body and the fixation plate. The water stop part prevents water intrusion between the flange part and the fixation plate.

In the present fishing reel waterproof structure, intrusion of seawater or so forth (hereinafter simply referred to as "water") into the bearing member can be inhibited by the seal member sealing between the reel body and the fixation plate and the water stop part preventing water intrusion between the flange part and the fixation plate. Accordingly, it is possible to inhibit occurrence of rotational failure of the handle shaft attributed to water intrusion.

The water stop part can be a grease sump recessed on a lateral surface of the flange part in opposition to the fixation plate. In this case, by filling up the grease sump with grease, it is possible to inhibit water intrusion into the interior of the bearing member through a gap between the flange part and the fixation plate.

The water stop part can be an annular rib provided on the fixation plate. The annular rib has a larger outer diameter than the flange part and covers at least part of an outer periphery of the flange part. Similarly to the above, in this case, it is also possible to inhibit water intrusion into the interior of the bearing member through the gap between the flange part and the fixation plate.

The reel body can include a frame, a first side cover and a cover element. The frame includes a first side plate and a second side plate disposed axially at an interval from the first side plate. The first side cover forms a space together with the first side plate therebetween, covers the first side plate from outside, and includes a part protruding radially from the frame. The cover element covers the part protruding radially from the frame. The fixation plate is sized to overlap part of a mating surface between the frame and the cover element.

In this case, the fixation plate is sized to overlap part of the mating surface between the frame and the cover element. Hence, even when water intrusion occurs through the mating surface, the fixation plate functions as an eave whereby it is possible to inhibit water intrusion into the interior of the bearing member.

Overall, according to the present disclosure, it is possible to inhibit intrusion of seawater or so forth into the interior of the bearing member supporting the handle shaft.

BRIEF DESCRIPTION OF THE DRAWINGS

Referring now to the attached drawings which form a part of this original disclosure.

DETAILED DESCRIPTION OF EMBODIMENTS

Figure 1:
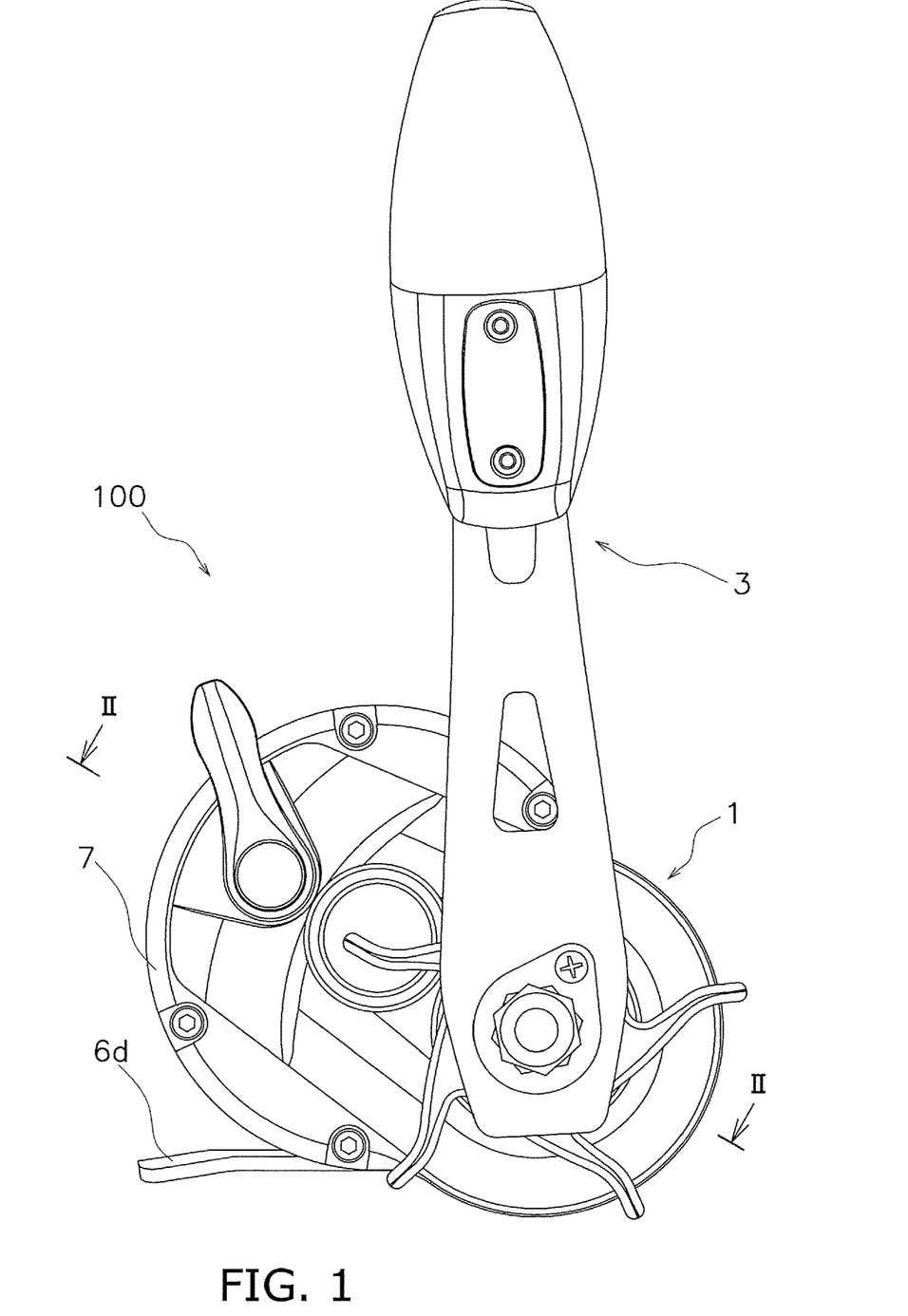
FIG. 1 is a side view of a dual-bearing reel employing a preferred embodiment of the present disclosure.
Figure 2:
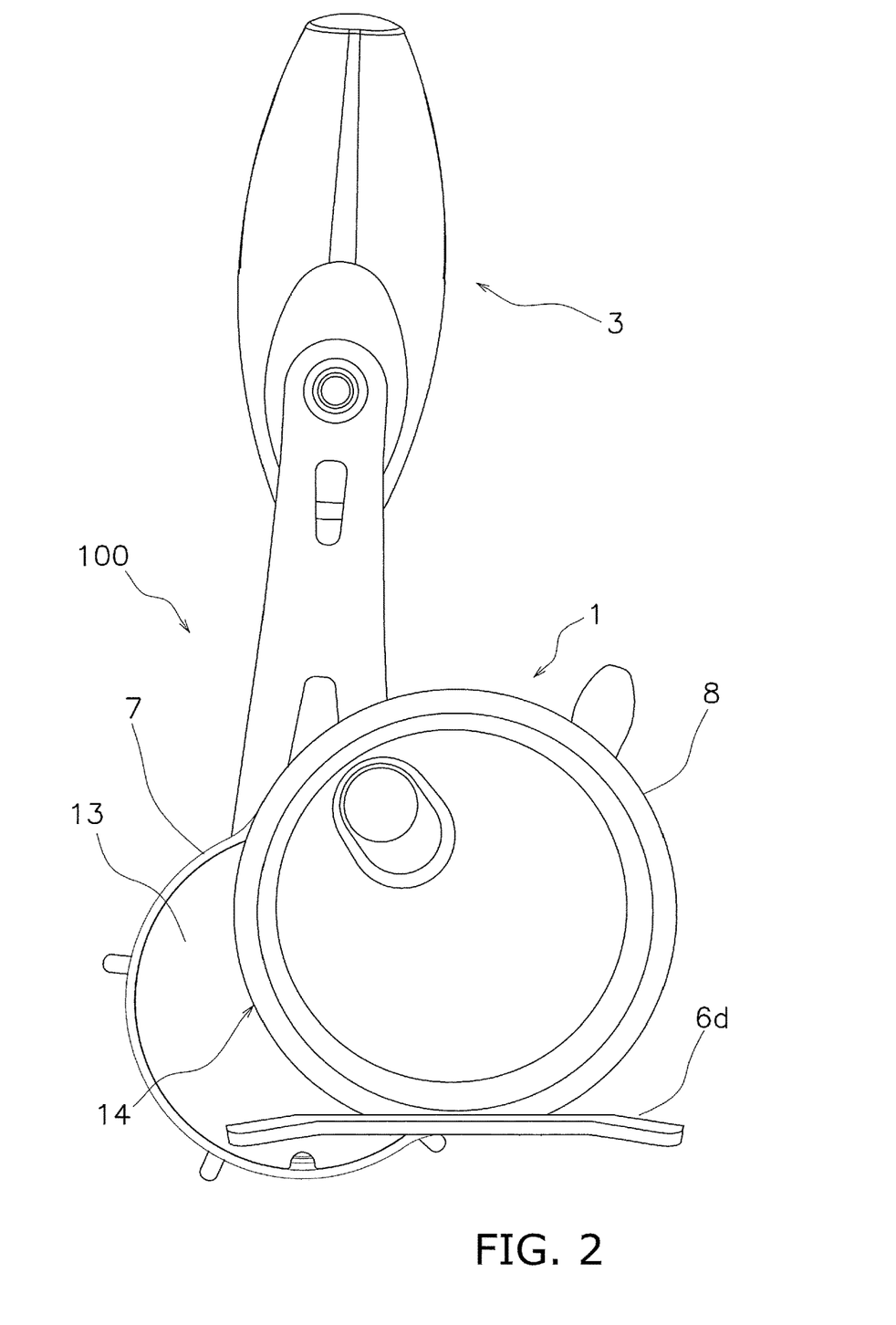
FIG. 2 is a side view of the dual-bearing reel employing the preferred embodiment of the present disclosure.
Figure 3:
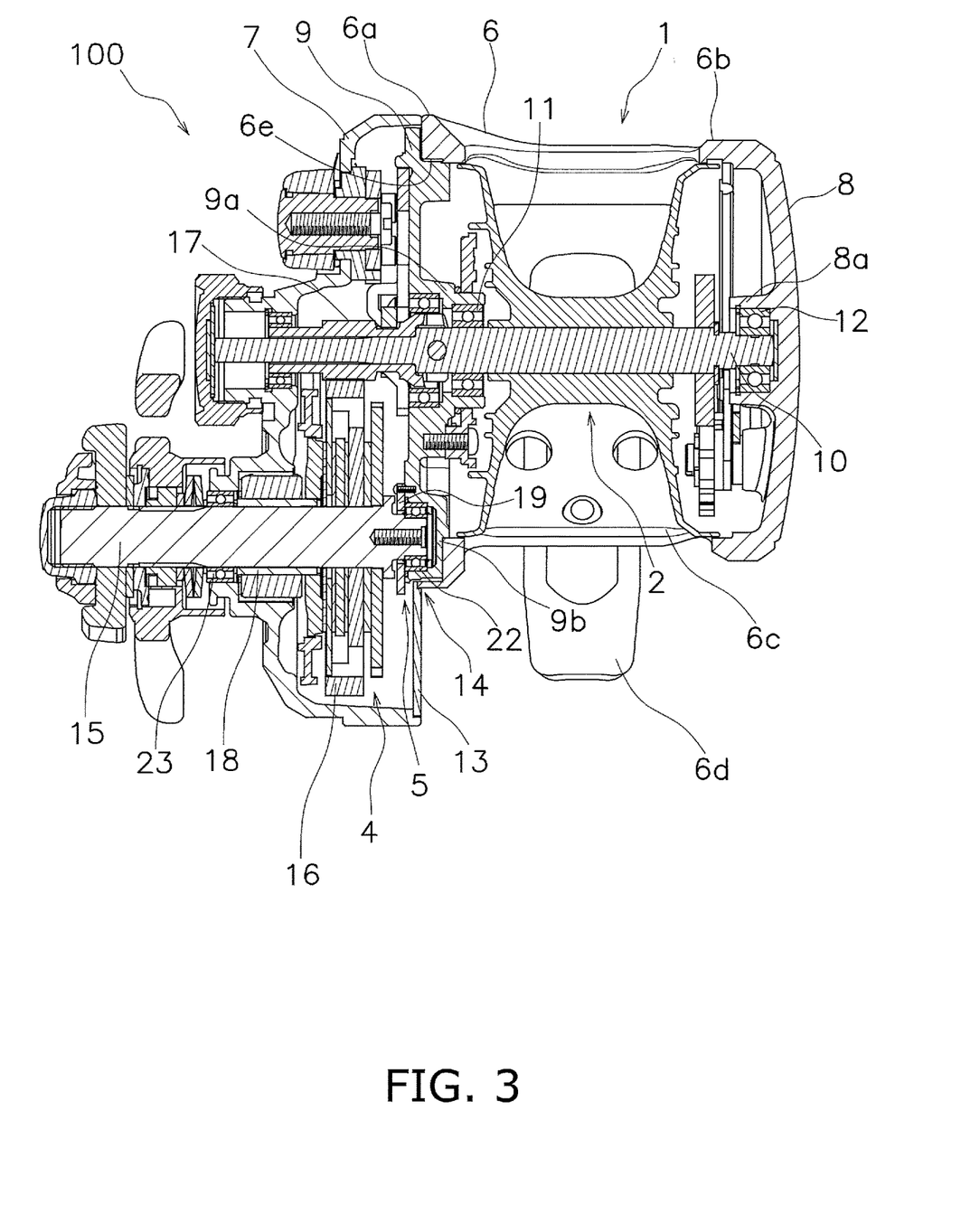
FIG. 3 is a cross-sectional view of FIG. 1 taken along line II-II.

As shown in FIGS. 1, 2 and 3, a dual-bearing reel 100, provided as a fishing reel employing a preferred embodiment of the present disclosure, includes a reel body 1, a spool 2, a handle 3, a rotation transmission mechanism 4 and a waterproof structure 5.

It should be noted that regarding the directional terms "front", "rear", "right" and "left" in the following explanation, the "front" direction refers to a direction of reeling out a fishing line in a condition that the dual-bearing reel 100 is attached to a fishing rod, and the "right" and "left" directions refer to directions based on a condition that the dual-bearing reel 100 is seen from the "rear" side.

The reel body 1 includes a frame 6, a first side cover 7, a second side cover 8, a cover element 13, a front cover (not shown in the drawings) and a mechanism attachment plate 9. The first and second side covers 7 and 8 are attached to the frame 6 so as to cover both sides of the frame 6. The cover element 13 covers part of the first side cover 7. The front cover is attached to the front side of the frame 6.

As shown in FIG. 3, the frame 6 includes a first side plate 6a, a second side plate 6b, a plurality of coupling portions 6c and an attachment portion 6d. The first and second side plates 6a and 6b are disposed in opposition to each other at a predetermined interval. The coupling portions 6c couple the first side plate 6a and the second side plate 6b.

The first side plate 6a is an approximately plate-shaped member including an opening 6e. The opening 6e is a circular opening through which the spool 2 is taken out. The second side plate 6b is integrated with the second side cover 8. The attachment portion 6d extends in a back-and-forth direction, and a fishing rod is attached to the lower surface side of the attachment portion 6d.

As shown in FIGS. 1 and 2, the first side cover 7 is shaped to bulge radially outward of the second side cover 8. Detailedly, the first side cover 7 is shaped to circularly bulge about a position below and forward of the second side cover 8.

Figure 4:
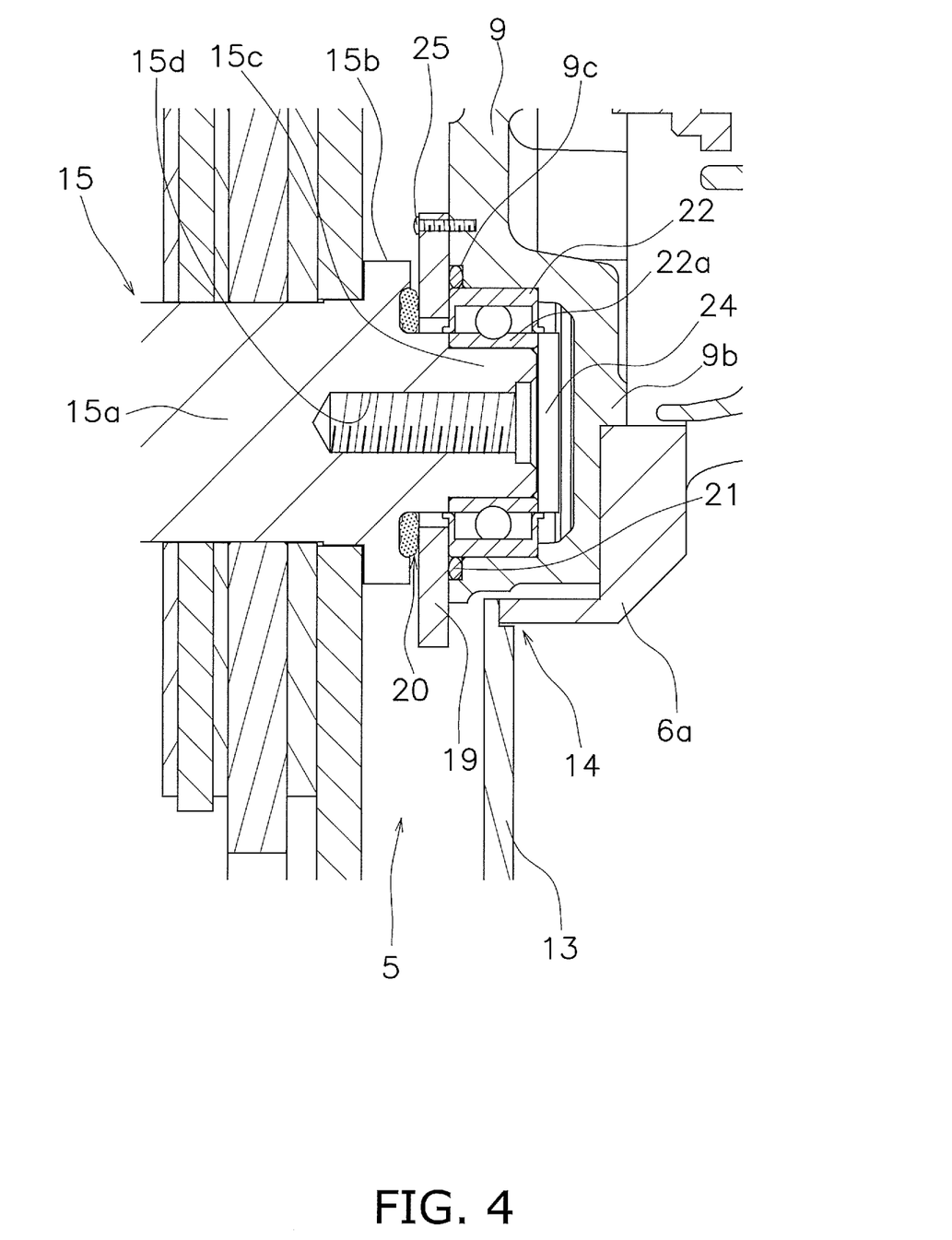
FIG. 4 is a partial enlarged view of a waterproof structure according to the preferred embodiment of the present disclosure.

The cover element 13 is a plate member having a crescent shape and covers the bulging part of the first side cover 7. As shown in FIGS. 2 and 3, the cover element 13 is disposed such that the curved outer edge thereof is along part of the outer edge of the first side plate 6a, and is fixed to the first side plate 6a by a plurality of bolts (not shown in the drawings). Additionally, as shown in FIGS. 3 and 4, a mating surface 14 between the cover element 13 and the first side plate 6a can be stepped by cutting. The outer edge of the cover element 13, opposed to the first side plate 6a, can be herein stepped by cutting, and the outer edge of the first side plate 6a is fitted to the stepped part.

The mechanism attachment plate 9 is a disc-shaped member and is disposed between the first side plate 6a and the first side cover 7. The mechanism attachment plate 9 has an outer diameter approximately equal to that of the first side plate 6a, and is fixed to the first side plate 6a by a plurality of bolts (not shown in the drawings). The rotation transmission mechanism 4 is accommodated between the mechanism attachment plate 9 and the first side cover 7.

As shown in FIG. 3, the spool 2 is rotatably disposed between the first side plate 6a and the second side plate 6b. A fishing line can be wound onto the outer peripheral surface of the spool 2. The spool 2 is fixed to a spool shaft 10 penetrating the middle of the spool 2, and is unitarily rotated with the spool shaft 10. Both ends of the spool shaft 10 are supported by bearing members 11 and 12 so as to be rotatable with respect to the reel body 1. The bearing member 11 is disposed in a first boss 9a of the mechanism attachment plate 9, whereas the bearing member 12 is disposed in a boss 8a of the second side cover 8.

As shown in FIG. 1, the handle 3 is rotatably attached to a lateral part of the first side cover 7. The spool 2 is driven by rotational operation of the handle 3 through the rotation transmission mechanism 4.

As shown in FIG. 3, the rotation transmission mechanism 4 includes a handle shaft 15, a drive gear 16 and a tubular pinion gear 17. The rotation transmission mechanism 4 is a mechanism that transmits rotation of the handle 3 to the spool 2.

The handle shaft 15 is coupled to the handle 3, and is unitarily rotated with the handle 3. As shown in FIG. 4, the handle shaft 15 includes a flange part 15b and a support part 15c. The flange part 15b is shaped to have a larger diameter than a shaft body 15a of the handle shaft 15. The support part 15c is shaped to have a smaller diameter than the shaft body 15a of the handle shaft 15. As shown in FIG. 3, the handle shaft 15 is rotatably supported by the reel body 1 through a bearing member 22 and a bearing member 23 disposed in the first side cover 7.

The support part 15c of the handle shaft 15 includes a screw hole 15d penetrating the support part 15c. A bolt 24 is screwed into the screw hole 15d, and an end surface of the head thereof is contacted to an inner race 22a of the bearing member 22. Accordingly, the handle shaft 15 is prevented from being detached from the bearing member 22. It should be noted that the handle shaft 15 is prevented from rotating in a fishing line releasing direction by a one-way clutch 18 disposed on the outer periphery of the handle shaft 15.

The drive gear 16 is attached to the handle shaft 15 and is unitarily rotated with the handle shaft 15.

The pinion gear 17 is meshed with the drive gear 16.

As shown in FIGS. 3 and 4, the waterproof structure 5 includes the flange part 15b, a fixation plate 19, a water stop part 20 and a seal member 21. The waterproof structure 5 is provided for inhibiting water intrusion into the interior of the bearing member 22 supporting one end of the handle shaft 15. The bearing member 22 is herein disposed in a second boss 9b of the mechanism attachment plate 9.

The flange part 15b is provided in the vicinity of the bearing member 22 supporting one end of the handle shaft 15. The flange part 15b is shaped to have a larger outer diameter than the bearing member 22.

The fixation plate 19 is a plate member having an approximately annular shape and the middle thereof is penetrated by part of the handle shaft 15. The fixation plate 19 is fixed to the mechanism attachment plate 9 by a plurality of bolt members 25. The inner peripheral part of the fixation plate 19 is disposed between the bearing member 22 and the flange part 15b while making contact with a lateral surface of the bearing member 22, whereby axial movement of the bearing member 22 is restricted. Thus, the fixation plate 19 is an example of a restricting means for restricting axial movement of the bearing member 22.

The fixation plate 19 is sized to overlap part of the mating surface 14 between the cover element 13 and the first side plate 6a of the frame 6. In other words, the fixation plate 19 extends radially outward of the mating surface 14 beyond a region in which the mating surface 14 and the outer peripheral part of the second boss 9b of the mechanism attachment plate 9 are close to each other. With this configuration, even when water intrusion occurs through the mating surface 14, the fixation plate 19 functions as an eave whereby it is possible to inhibit water intrusion into the interior of the bearing member 22. Thus, the fixation plate 19 is also an example of a means for inhibiting water intrusion into the interior of the bearing member 22. It should be noted that the fixation plate 19 is processed by water repellent treatment.

The water stop part 20 is herein a grease sump recessed on a lateral surface of the flange part 15b. The water stop part 20 is provided in a position approximately opposed to the bearing member 22. The water stop part 20 is filled up with grease through a gap between the flange part 15b and the fixation plate 19. This inhibits water intrusion into the interior of the bearing member 22 through the gap between the flange part 15b and the fixation plate 19. Thus, the water stop part 20 is an example of a means for preventing water intrusion into the interior of the bearing member 22 through the gap between the flange part 15b and the fixation plate 19.

The seal member 21 is an elastic element made of elastically deformable resin or so forth. The seal member 21 is disposed in a hole part 9c and makes contact with the fixation plate 19 and the bearing member 22. The hole part 9c has an annular shape and is provided on an end surface of the second boss 9b of the mechanism attachment plate 9.

The seal member 21 inhibits water intrusion into the interior of the bearing member 22 by sealing between the mechanism attachment plate 9 of the reel body 1 and the fixation plate 19. Thus, the seal member 21 is an example of a sealing means for sealing between the mechanism attachment plate 9 of the reel body 1 and the fixation plate 19. Additionally, the seal member 21 inhibits grease filled in the water stop part 20 from flowing out through the gap between the bearing member 22 and the fixation plate 19 via the inner peripheral part of the fixation plate 19. Thus, the seal member 21 is also an example of a means for inhibiting grease filled in the water stop part 20 from flowing out through the gap between the bearing member 22 and the fixation plate 19 via the inner peripheral part of the fixation plate 19.

<Other Preferred Embodiments>

One preferred embodiment of the present disclosure has been explained above. However, the present disclosure is not limited to the above, and a variety of changes can be made without departing from the scope of the present disclosure.

Figure 5:
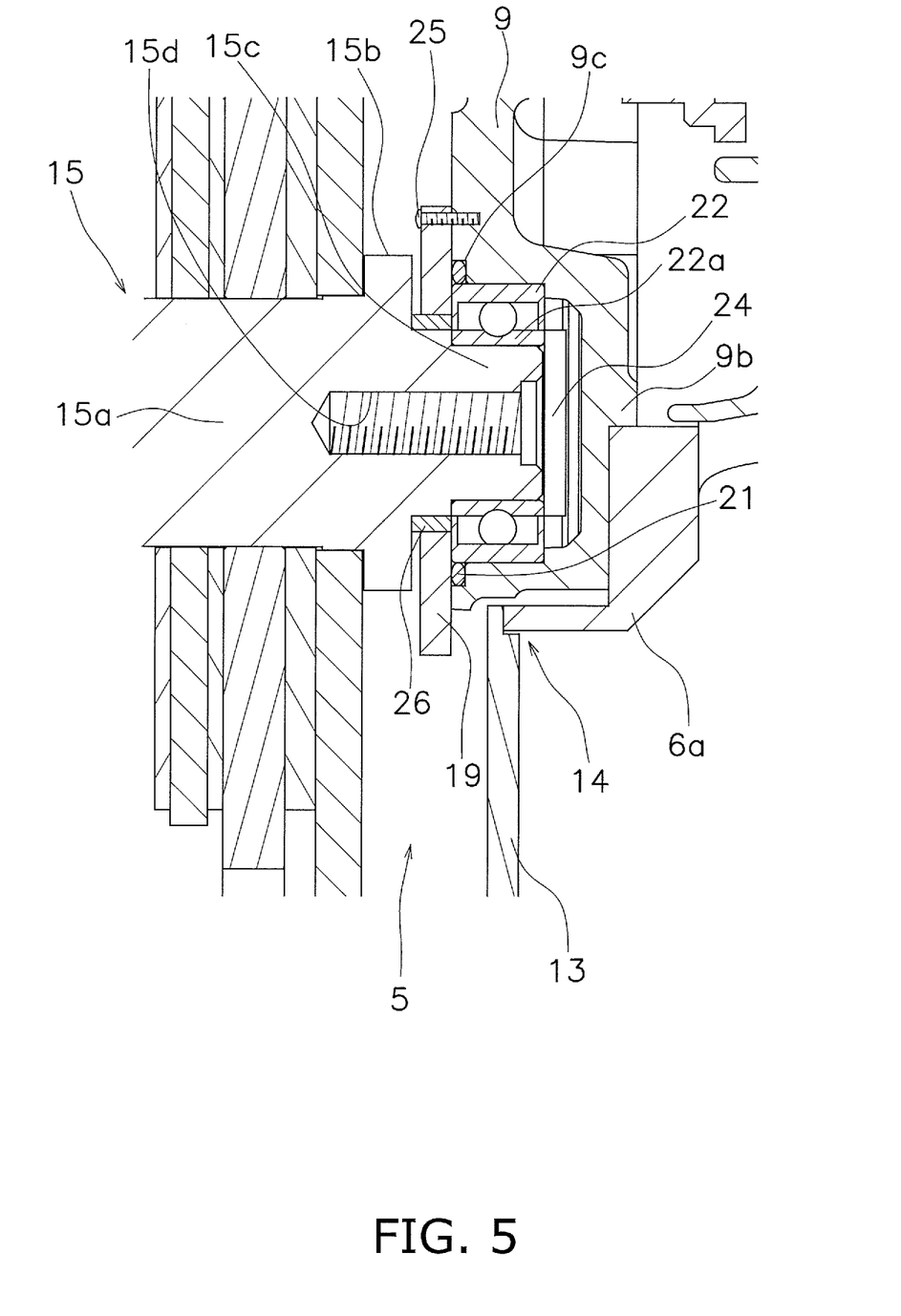
FIG. 5 is a partial enlarged view of a waterproof structure according to another preferred embodiment.
Figure 6:
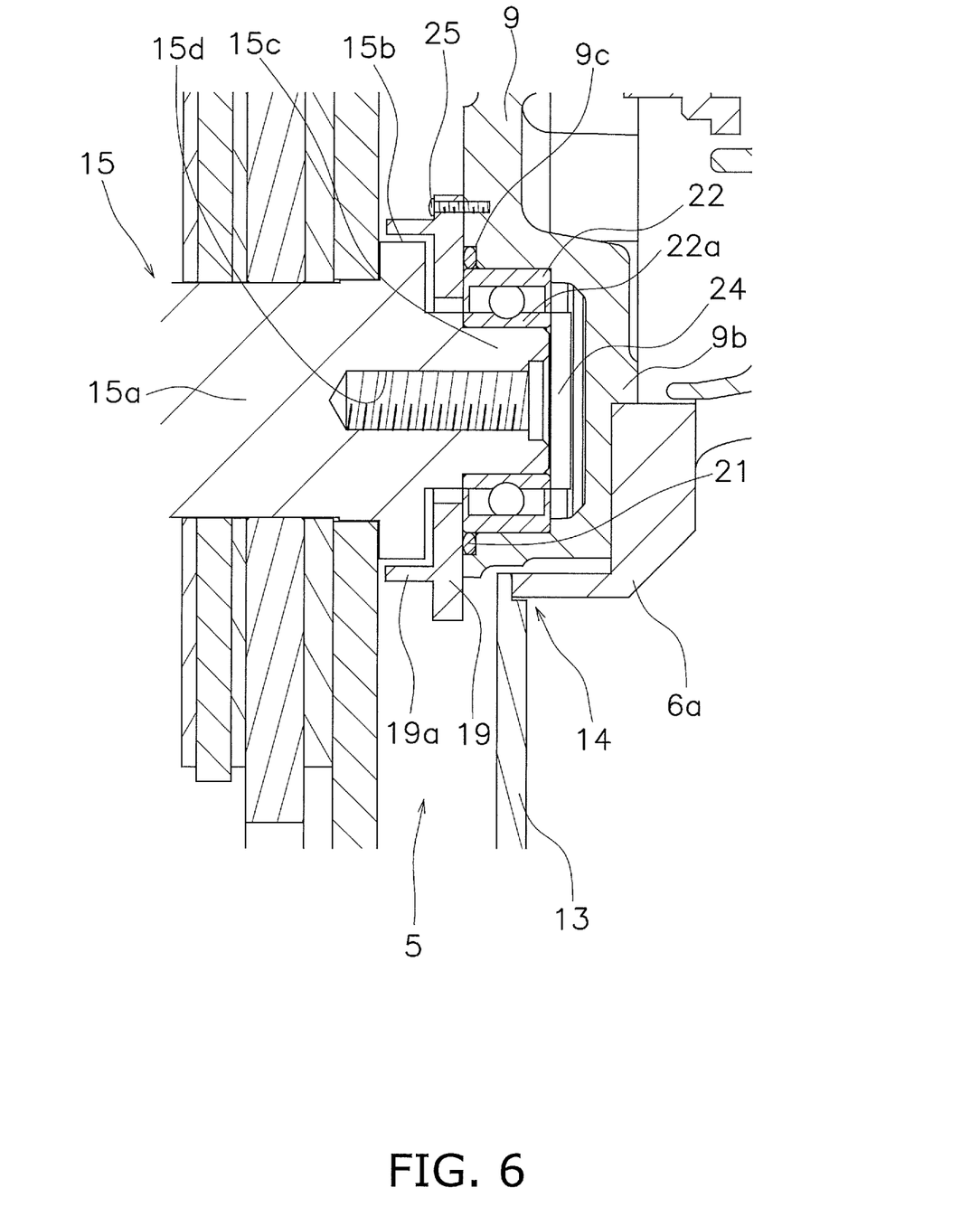
FIG. 6 is a partial enlarged view of a waterproof structure according to yet another preferred embodiment.

(a) In the aforementioned preferred embodiment, the water stop part 20 is designed as the grease sump provided on the lateral surface of the handle shaft 15. However, as shown in FIG. 5, the water stop part 20 can be a tubular bushing 26 made of synthetic resin or so forth. The bushing 26 is disposed between the flange part 15b and the bearing member 22 in the inner peripheral part of the fixation plate 19. It should be noted that the bushing 26 is processed by water repellent treatment. Alternatively as shown in FIG. 6, the fixation plate 19 can be provided with an annular rib 19a as the water stop part 20. The rib 19a is shaped to have an inner diameter larger than the outer diameter of the flange part 15b, and is provided to cover at least part of the outer periphery of the flange part 15b. Moreover, the rib 19a can be provided in combination with the bushing 26 and/or the grease sump provided on the lateral surface of the flange part 15b.

(b) In the aforementioned preferred embodiment, the fixation plate 19 is designed as a plate member having an approximately annular shape. However, the fixation plate 19 can be formed in a labyrinth structure as shown in FIG. 6 by bending the fixation plate 19 to form the annular rib 19a as explained above so as to further effectively inhibit water intrusion. Thus, the labyrinth structure is an example of another means for inhibiting water intrusion.

What is claimed is:

1. A fishing reel waterproof structure for preventing water intrusion into a bearing member, the bearing member supporting an end of a handle shaft so as to make the end of the handle shaft rotatable with respect to a reel body, the waterproof structure comprising:
   a flange part provided on the handle shaft in a vicinity of the end of the handle shaft;
   a fixation plate configured to restrict axial movement of the bearing member, the fixation plate having an annular shape, the fixation plate fixed to the reel body, the fixation plate disposed such that an inner peripheral part of the fixation plate is disposed between the flange part and the bearing member to contact a lateral surface of the bearing member;
   a seal member disposed to contact the fixation plate and the bearing member, the seal member configured to seal between the reel body and the fixation plate; and
   a water stop part configured to prevent water intrusion between the flange part and the fixation plate.

2. The fishing reel waterproof structure according to claim 1, wherein the water stop part is a grease sump recessed on a lateral surface of the flange part in opposition to the fixation plate.

3. The fishing reel waterproof structure according to claim 1, wherein the water stop part is an annular rib provided on the fixation plate, the annular rib having a larger outer diameter than the flange part, the annular rib covering at least part of an outer periphery of the flange part.

4. The fishing reel waterproof structure according to claim 1, wherein
   the reel body includes
   a frame including a first side plate and a second side plate, the second side plate disposed axially at an interval from the first side plate,
   a first side cover that forms a space together with the first side plate therebetween, the first side cover covering the first side plate from outside, the first side cover including a part protruding radially from the frame, and
   a cover element configured to cover the part protruding radially from the frame, and
   the fixation plate is sized to overlap part of a mating surface between the frame and the cover element.

5. The fishing reel waterproof structure according to claim 4, wherein the second side plate is disposed at an interval from the first side plate in an axial direction of a spool shaft.

6. The fishing reel waterproof structure according to claim 1, wherein the water stop part is a bushing disposed between the flange part and the bearing member in the inner peripheral part of the fixation plate.

7. A fishing reel, comprising:
   a reel body including
   a frame including a first side plate and a second side plate, the second side plate disposed axially at an interval from the first side plate,
   a first side cover to form a space together with the first side plate therebetween, the first side cover covering the first side plate from outside, the first side cover including a part protruding radially from the frame, and
   a cover element to cover the part protruding radially from the frame, and
   a fishing reel waterproof structure configured to prevent water intrusion into a bearing member, the bearing member to support an end of a handle shaft to make the end of the handle shaft rotatable with respect to the reel body, the waterproof structure including
   a flange part provided on the handle shaft in a vicinity of the end of the handle shaft;
   a fixation plate configured to restrict axial movement of the bearing member, the fixation plate fixed to the reel body, the fixation plate disposed such that an inner peripheral part of the fixation plate is disposed between the flange part and the bearing member to contact a lateral surface of the bearing member, the fixation plate overlapping part of a mating surface between the frame and the cover element;
   a seal member configured to seal between the reel body and the fixation plate; and
   a water stop part configured to prevent water intrusion between the flange part and the fixation plate.

8. The fishing reel according to claim 7, wherein the water stop part is a grease sump recessed on a lateral surface of the flange part in opposition to the fixation plate.

9. The fishing reel according to claim 7, wherein the water stop part is an annular rib provided on the fixation plate, the annular rib having a larger outer diameter than the flange part, the annular rib covering at least part of an outer periphery of the flange part.

10. The fishing reel according to claim 7, wherein the second side plate is disposed at an interval from the first side plate in an axial direction of a spool shaft.

11. The fishing reel according to claim 7, wherein the fixation plate has an annular shape.

12. The fishing reel according to claim 7, wherein the fixation plate is formed in a labyrinth structure to inhibit water intrusion.

* * * * *